Nov. 30, 1971    D. G. SMITH    3,623,224
DENTAL INSTRUMENT
Filed Nov. 28, 1969    5 Sheets-Sheet 1

INVENTOR
DONALD G. SMITH

BY *Shoemaker and Mattare*

ATTORNEYS

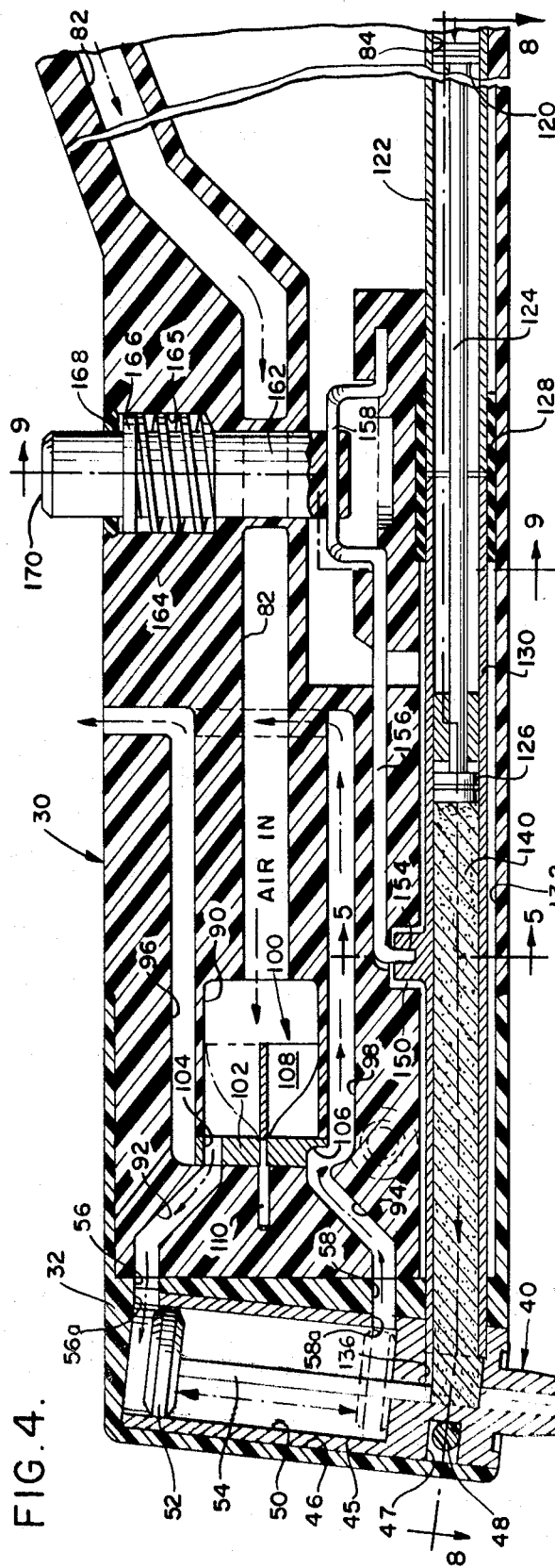

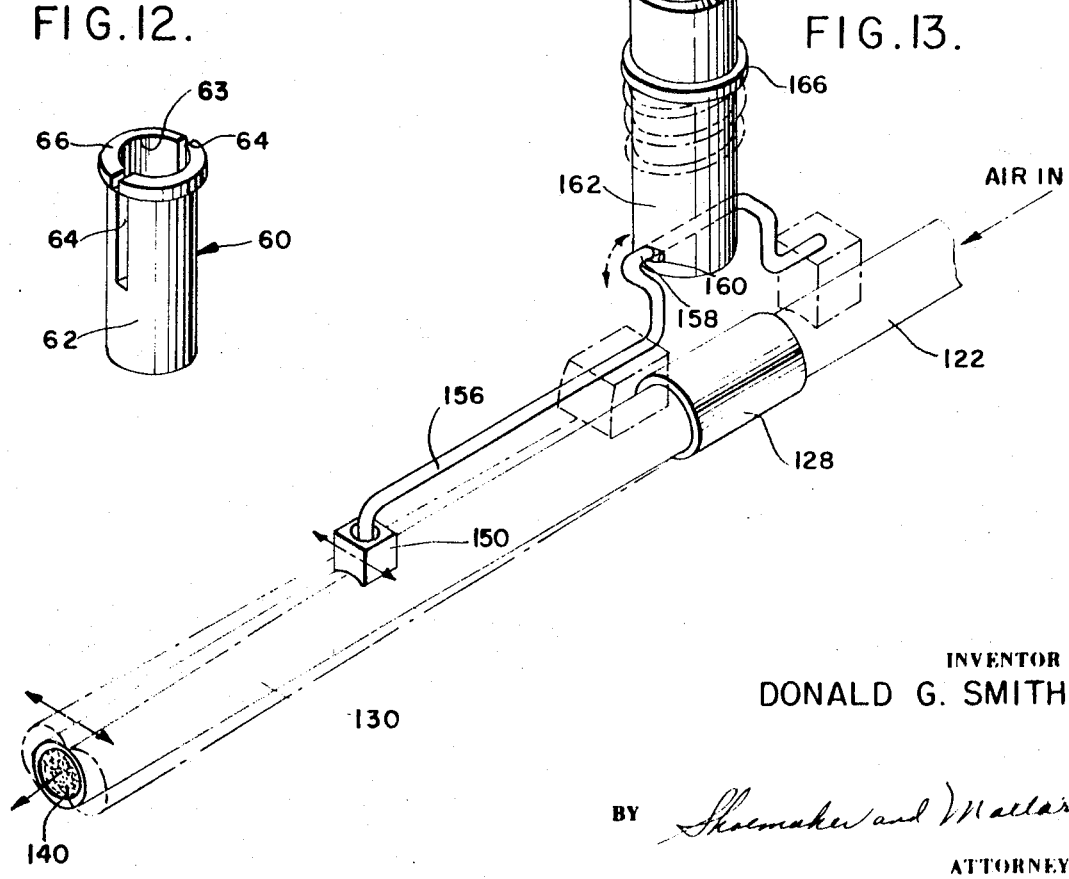

Nov. 30, 1971  D. G. SMITH  3,623,224
DENTAL INSTRUMENT
Filed Nov. 28, 1969  5 Sheets-Sheet 4

INVENTOR
DONALD G. SMITH

BY  *Shoemaker and Mattare*

ATTORNEYS

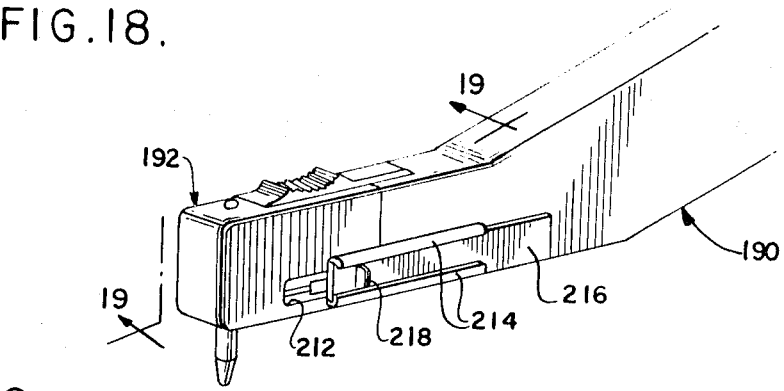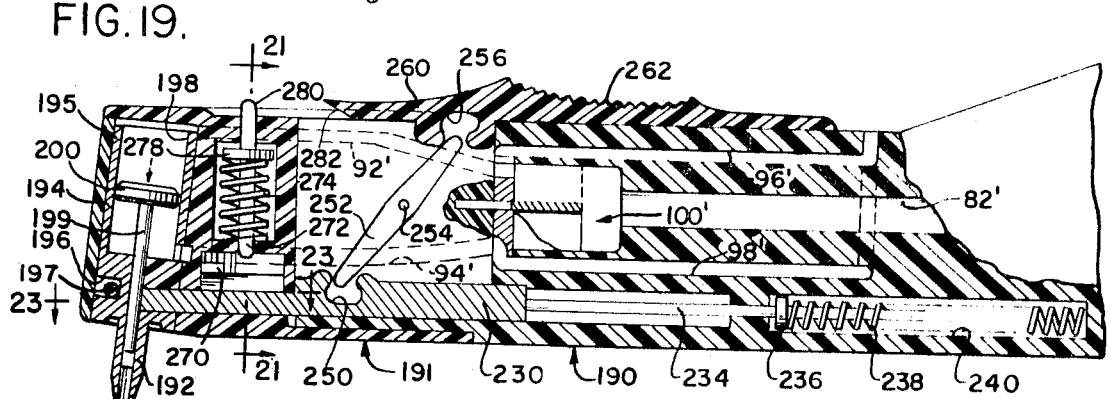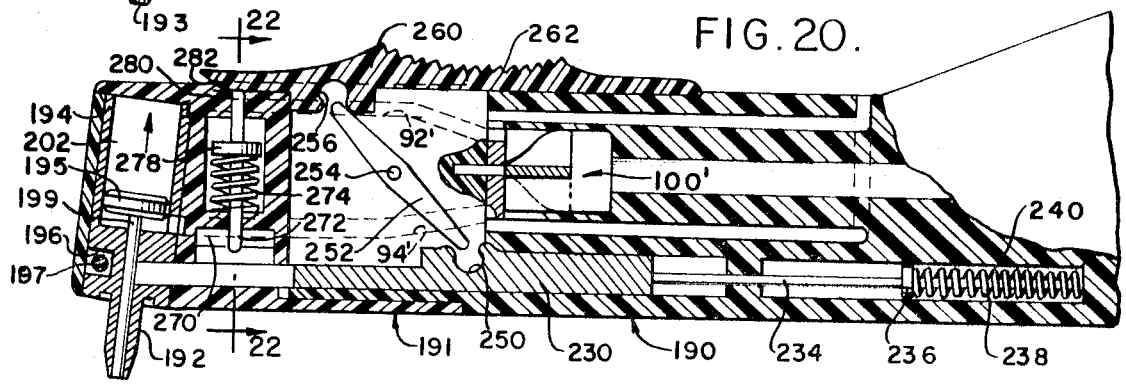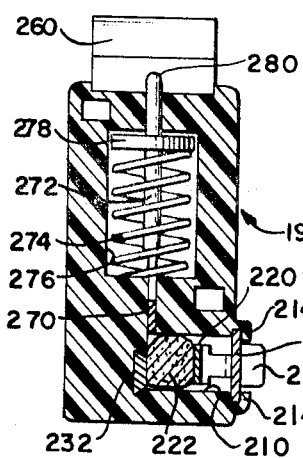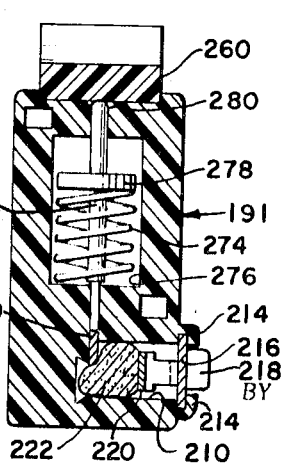

United States Patent Office
3,623,224
Patented Nov. 30, 1971

3,623,224
DENTAL INSTRUMENT
Donald G. Smith, 299 Alhambra Circle,
Coral Gables, Fla. 33146
Filed Nov. 28, 1969, Ser. No. 880,566
Int. Cl. A61c 5/04
U.S. Cl. 32—60                                        20 Claims

ABSTRACT OF THE DISCLOSURE

A housing supports a working tip having a bore formed therethrough, a fluid operated plunger being mounted for reciprocation within said bore to feed amalgam from the end of said working tip and to compact amalgam in a tooth. Storage means is provided within the housing for receiving a reserve supply of amalgam, and separate transfer feed means is provided within the housing for feeding amalgam directly from the storage means into the bore formed in the working tip and into the path of movement of the reciprocating plunger during operation of the instrument. The feed means is continuously operated while the instrument is in use, and manual control means is also provided in certain modifications for additionally controlling the feed means.

CROSS REFERENCE TO RELATED APPLICATION

The present invention discloses various forms of a dental instrument which represent improvements over similar dental instruments disclosed in co-pending U.S. pat. application Ser. No. 628,192, filed Feb. 9, 1967.

BACKGROUND OF THE INVENTION

The present invention relates to dental apparatus to be used in connection with the filling of a tooth cavity.

The present invention is directed to a novel dental instrument adapted to perform a dual function. When it is necessary to fill a cavity in a tooth with filling material such as a silver amalgam, the material must first be inserted into the cavity of the tooth and then compacted into the cavity so that it is fully filled. This compacting results in greater hardness of the amalgam and eliminates voids therewithin. This is most effectively accomplished by providing forceful blows or impacts to the amalgam when in the cavity in the tooth. In the prior art, different instruments are employed for carrying out these operations. Furthermore, additional filling material may be required to be inserted in the cavity from time to time and the dentist or his assistant has to carry this additional filling material from its place of preparation to the patient.

These operations as carried out in the prior art necessitate the use of different dental instruments and a considerable amount of time is spent in changing from one instrument to another.

SUMMARY OF THE INVENTION

In the present invention, the dental instrument is adapted to perform the dual function of inserting the amalgam material into the cavity in a tooth and also to compact the amalgam after it is inserted into the cavity.

The instrument of the present invention includes means for readily filling or refilling the instrument with a dental amalgam material as required.

The instrument of the present invention employs a working tip having a bore formed therethrough, the working tip being adapted to extend into the cavity in a tooth. This arrangement will prevent excessive penetration of amalgam material over the good part of the tooth and will prevent actual contact of the vibrating compacting member with the tooth since the vibrating compacting member travels through the hollow working tip during operation of the apparatus.

Power-operated means is provided for operating the plunger of the present invention which serves both to move the material through the working tip and to compact it after being inserted in place. Additionally, novel feed means is provided for forcefully feeding amalgam material to the working tip and the plunger so that a substantially continuous filling and compacting operation may be carried out thereby resulting in a considerable saving in time and effort on the part of the dentist.

In certain forms of the present invention, the housing includes a removable head which facilitates refilling of the storage means of the apparatus with amalgam.

In one form of the invention, the storage means includes a flexible tube which is movable laterally with respect to the housing, and manually operable means is connected therewith for selectively adjusting the position of this flexible tubular member to insure that all of the amalgam carried thereby is effectively fed into the path of movement of the reciprocating plunger of the instrument. The cross-sectional dimension of the tubular feed member is substantially greater than the cross-sectional dimension of the feed plunger.

In another form of the invention, the tubular feed member is not mounted for movement laterally with respect to the housing, but the tubular feed member has an elongated dimension in the direction of reciprocatory movement of the plunger. In each of the two above-described forms of the invention, the volume of the storage means is substantially increased over that of a storage means which would have a cross-sectional dimension only equal to that of the cross-sectional dimension of the reciprocating plunger which, of necessity, must be relatively small.

In another form of the invention, the feed means includes a feed member normally biased in one direction, and manually operable means is provided for moving it in opposite directions. In this form of the invention, a feed opening is provided in the side of the housing and a closure means is provided for closing off the feed opening. A separate feed plunger is provided in this latter form of the invention which is movable into the storage means and is engageable with amalgam. This separate feed plunger is resiliently biased away from the storage means and is moved into the storage means by operation of the aforesaid manually operable means controlling the movement of the feed member.

BRIEF DESCRIPTION OF THE DRAWINGS

FIG. 4 is an enlarged vertical longitudinal section through the structure shown in FIG. 1, being partly broken away for the purpose of illustration;
FIG. 5 is a sectional view taken substantially along line 5—5 of FIG. 4, looking in the direction of the arrows;
FIG. 6 is a view similar to FIG. 5, showing the components in a different operative position;
FIG. 7 is a further view similar to FIG. 5 showing the components in still another operative position;
FIG. 8 is a sectional view partly broken away and taken substantially along 8—8 of FIG. 4, looking in the direction of the arrows;
FIG. 9 is a sectional view taken substantially along line 9—9 of FIG. 4, looking in the direction of the arrows;
FIG. 10 is a view similar to FIG. 9 illustrating the components in a different operative position;

FIG. 11 illustrates the plunger in its lower-most position, and further shows a sleeve disposed in surrounding relationship to the working tip which is operatively associated with a tooth;

FIG. 12 is a top perspective view of the sleeve shown in FIG. 11;

FIG. 13 is a top perspective view of a portion of the structure shown in FIG. 4 illustrating the manually operated means for moving a tubular feed member laterally with respect to the housing;

FIG. 18 is a top perspective view of still another form of the invention;

FIG. 19 is a longitudinal sectional view on an enlarged scale taken substantially along line 19—19 of FIG. 18, looking in the direction of the arrows;

FIG. 20 is a view similar to FIG. 19 illustrating the components in a different operative position;

FIG. 21 is a sectional view on an enlarged scale taken substantially along line 21—21 of FIG. 19, looking in the direction of the arrows;

FIG. 22 is a view similar to FIG. 21 illustrating the components in a different operative position; and FIG. 23 is a sectional view on an enlarged scale taken substantially along line 23—23 of FIG. 19, looking in the direction of the arrows.

DESCRIPTION OF THE PREFERRED EMBODIMENTS

Figure 1:
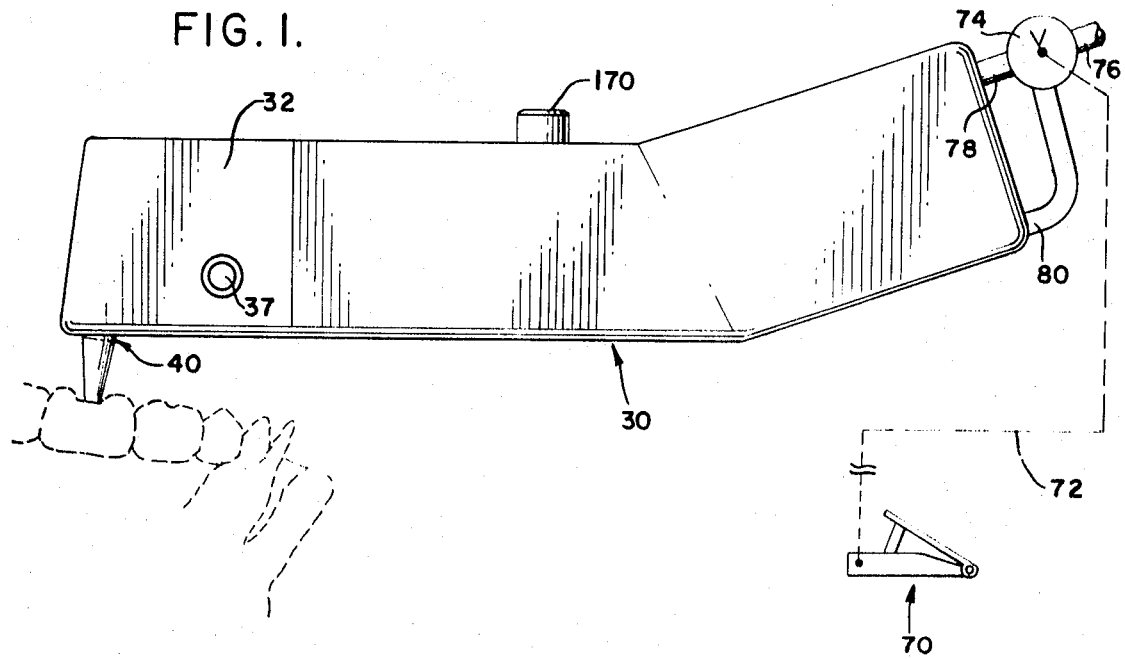
FIG. 1 is an elevation of a first form of the invention.
Figure 2:
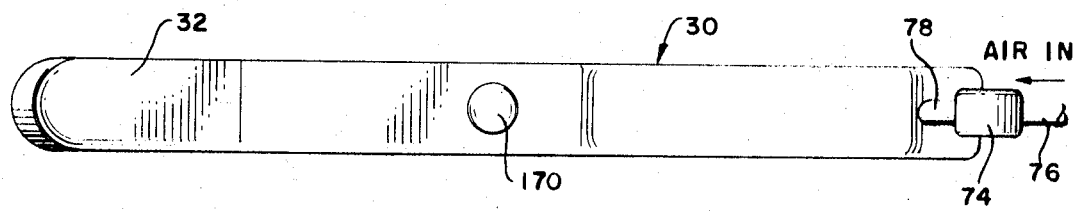
FIG. 2 is a top view of the apparatus shown in FIG. 1.

Referring now to the drawings wherein like reference characters designate corresponding parts throughout the several views, a first form of the invention is illustrated in FIGS. 1–13 inclusive.

Figure 3:
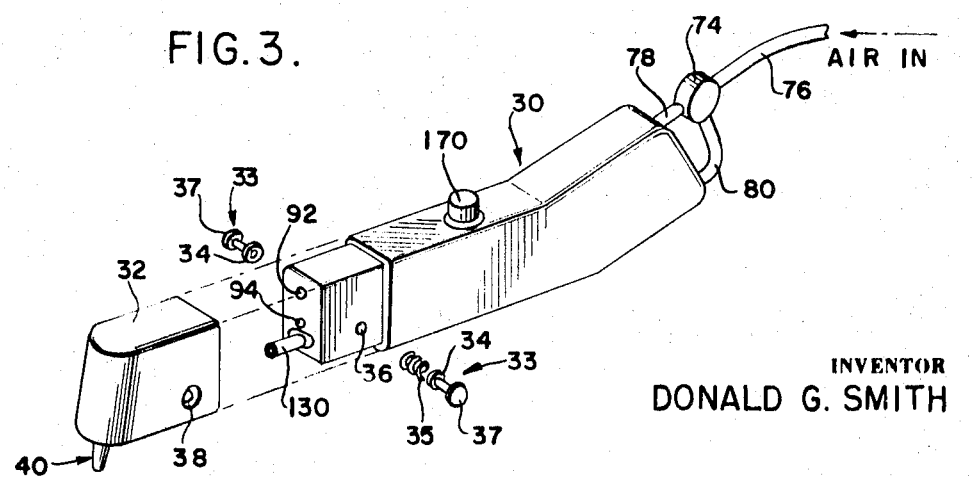
FIG. 3 is a top perspective exploded view of the apparatus shown in FIGS. 1 and 2.
Figure 14:
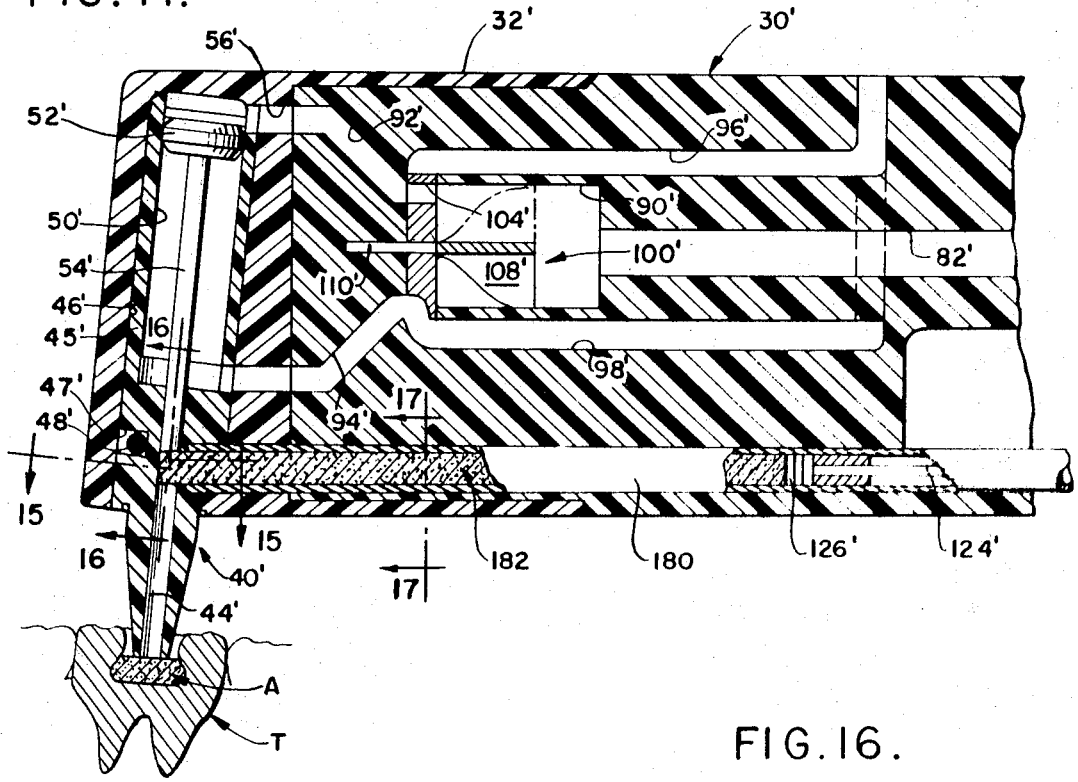
FIG. 14 is a longitudinal section through a modified form of the invention.
Figure 15:
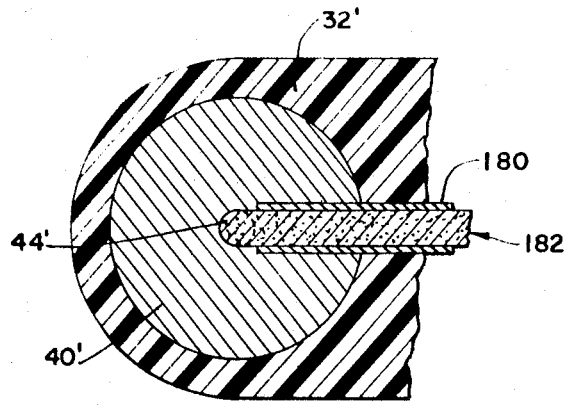
FIG. 15 is a sectional view in an enlarged scale taken substantially along line 15—15 of FIG. 14, looking in the direction of the arrows.
Figure 16:
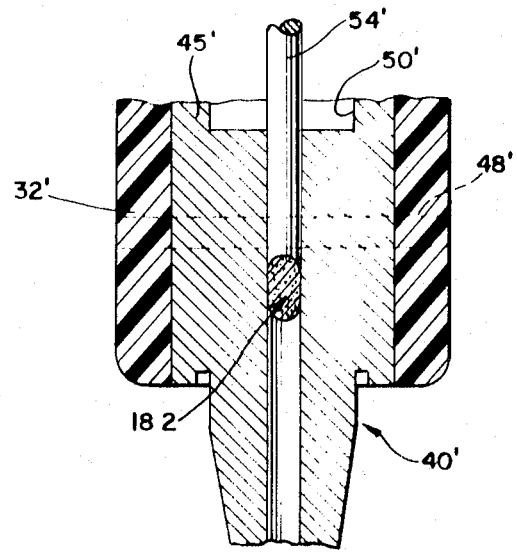
FIG. 16 is an enlarged sectional view taken substantially along line 16—16 of FIG. 14, looking in the direction of the arrows.

The instrument includes a housing indicated generally by reference numeral 30, this housing having a removable head 32 which is shown in FIG. 3 as being removed from the main portion of the housing means. The removable head is adapted to be detachably secured to the housing means by suitable quick disconnect means such as a pair of members 33 having enlarged inner ends 34 engaged by a compression spring 35 supported within housing 30. The reduced intermediate portions of members 33 extend through holes 36 formed in the housing, and members 33 are normally biased in an outward direction. The enlarged outer ends 37 of members 33 are received in holes 38 formed in opposite sides of head 32 for normally holding the head in operative position. When it is desired to remove the head, members 33 are pushed inwardly by pressing on the enlarged ends 37 thereof whereon the head can be removed as shown in FIG. 3.

Working tip indicated generally by reference numeral 40 is supported by the removable head and includes an outer end portion having a tapered outer surface 42 of generally frusto-conical configuration. A bore 44 extends longitudinally through the working tip and may have any desired cross-sectional configuration in accordance with the desired cross-sectional configuration of the associated plunger hereinafter described.

The working tip includes an integral hollow cylindrical portion 45 which is slidably mounted within a complementary bore 46 formed in head 32. A slot 47 is formed in the outer surface of the working tip and receives an undersize locking pin 48 for retaining the working tip in assembled relationship.

The provision of the undersize locking pin permits the working tip to reciprocate within bore 46 of the head upon reciprocation of the associated piston hereinafter described as the piston strikes the head or the tip during operation. This reciprocation of the working tip causes it to vibrate sufficiently while in use to adequately condense amalgam into a tooth cavity.

A cylindrical bore 50 is provided within portion 45 of the working tip and slidably receives a piston 52 having a plunger 54 secured thereto. Plunger 54 is complementary to the configuration of bore 44 and is slidably disposed therewithin whereby the plunger is adapted to reciprocate between the positions shown in FIG. 4 and FIG. 11 of the drawings. A pair of passages 56 and 58 formed in the head are in communication with passages 56a and 58a respectively, formed in the working tip which are in turn in communication with opposite ends of cavity 50 whereby suitable fluid under pressure, such as air, is adapted to enter and leave opposite ends of the cavity to cause reciprocation of the piston and plunger.

As seen in FIG. 11, when filling a relatively large cavity in a tooth T, a sleeve indicated generally by reference numeral 60 may be mounted on the external surface of the working tip in order to increase the effective end area of the tip which is adapted to vibrate and condense the amalgam A disposed within the tooth when filling same. As seen in FIG. 12, this sleeve is of generally tubular construction and includes a body portion 62 having a bore 63 formed therethrough which is substantially complementary to the outer surface of the working tip. A pair of longitudinally extending slots 64 are provided in diametrically opposite portions of body means 62 to afford resiliency to the sleeve whereby it is adapted to be snugly retained in operative position. An enlarged peripheral flange 66 is formed at the upper end of the sleeve to rigidify the construction.

Referring now to FIG. 1, a foot pedal 70 is provided whereby a dentist can remotely control the feed of fluid, such as air under pressure, to the instrument. The foot pedal is connected by a suitable electric lead 72 or the like to a remotely operated valve 74 connected in a line 76 operatively associated with a source of fluid under pressure. Valve 74 is adapted to selectively control the flow of fluid under pressure to a pair of conduits 78 and 80 which are, respectively, connected with passages 82 and 84 as seen in FIG. 4 which are disposed within the housing means of the instrument.

Passage 82 is in communication with an enlarged chamber 90 formed within the housing. Enlarged chamber 90 is adapted to be alternately placed in communication with passages 92 and 94 which in turn are in communication with the aforementioned passages 56 and 58 respectively, formed in the removable head. Chamber 90 is also adapted to be placed in communication with a pair of passages 96 and 98, each of which is in communication with the exterior of the housing and thereby permits fluid to be exhausted to ambient atmosphere.

An air flow control mechanism indicated generally by reference numeral 100 is of substantially the same construction as a corresponding air flow control mechanism illustrated and described in U.S. patent application Ser. No. 628,192 referred to hereinabove. This air flow control mechanism includes a disc-like body means 102 having a hole 104 extending longitudinally therethrough and being generally of kidney-shaped cross-sectional configuration. This hole extends through an arc of approximately 150 degrees. A cut-out portion 106 is provided on the rear face of the body portion 102, this cut-out portion extending through an arc of approximately 150 degrees.

A vane member 108 extends longitudinally from the forward face of body portion 102. This vane member is twisted so that air flowing through chamber 90 will cause the body means to rotate when it impinges upon the vane member. A shaft 110 extends longitudinally of body portion 102 from the rear face thereof, this shaft being supported within a hole provided in the housing means whereby the air flow control means is rotatably supported within the housing means.

As shown in FIG. 4, hole 104 is aligned with passage 92 whereby air is applied to the upper surface of piston 52 driving the piston downwardly. Cut-out portion 106 is aligned with passage 98 so that air beneath the piston can be exhausted through passages 58 and 94, cut-out portion 106 and thence to atmosphere through passage 98.

As body portion 102 rotates due to the flow of air over the vane 108, hole 104 becomes aligned with passage 94 while cut-out portion 106 becomes aligned with passage 92. When this occurs, air will pass through passages 94 and 58 to the undersurface of the piston urging the piston upwardly, while air above the piston is exhausted through passages 56 and 92, cut-out portion 106 and thence to atmosphere through passage 96.

As body portion 102 continues to rotate, the cycle of operation will continuously be repeated so that piston 52 and plunger 54 will be rapidly reciprocated.

As seen most clearly in FIGS. 4 and 8, fluid pressure within passage 84 impinges upon a piston 120 slidably disposed within a tubular member 122. Piston 120 includes a flexible connecting rod 124 having a further piston 126 mounted on the opposite end thereof. A connecting sleeve 128 connects tubular member 122 with a further tubular member 130 of flexible construction, tubular member 130 being received within a cavity 132 formed in the housing. As seen most clearly in FIG. 8, cavity 132 flares outwardly in a lateral direction toward the outer end of the housing means, this cavity joining with a similarly flared cavity 134 formed in the removable head. A cavity 136 is also formed in the working tip. These aligned flared cavities in the housing means and the head as well as the cavity in the working tip enable flexible tubular member 130 to be oscillated in a lateral direction as indicated by arrow A in FIG. 8 of the drawings.

It will be noted, as seen in FIG. 8, that the cross-sectional area of the body of amalgam 140 received within tubular member 130 is substantially greater than that of the bore 44 formed in the working tip and the corresponding plunger 54. In order to effectively feed all portions of the amalgam downwardly through bore 44, it is necessary, during operation of the apparatus, to oscillate tubular member 130 from side to side to insure that the plunger can engage all end portions of the body of amalgam.

As seen in FIG. 3, when removable head 32 is removed from the main portion of the housing means, the end of tubular member 130 is exposed whereby it can be readily filled with amalgam from suitable filling apparatus.

A separate manual control is provided for controlling the feed of amalgam, and in order to oscillate flexible member 130, an integral boss 150 is formed on member 130 and has a generally V-shaped notch formed therein as seen most clearly in FIGS. 5, 6 and 7. Notch 152 receives the depending end 154 of a crank member 156 journaled for rotation within the housing means. Crank member 156 includes an offset portion 158 received withing a slot 160 formed through the lower portion of an elongated member 162 which is mounted for sliding movement within the housing means.

A compression spring 164 is disposed within a cavity 165 formed in the housing means and engages the underside of an integral radially outwardly directed circumferentially extending flange 166 formed on member 162 and normally biases member 162 in an upward direction as seen in the drawings. An annular closure member 168 is threaded within the threaded upper end of cavity 165 and retains member 162 within the housing means. The upper end 170 of member 162 extends outwardly of the housing whereby it may be manually engaged and manipulated during operation of the instrument.

It is apparent that manual movement of elongated member 162 will cause the crank member to rotate thereby carrying flexible tubular member 130 from side to side.

FIG. 5 shows flexible member 130 in its central position, and FIGS. 6 and 7 illustrate flexible member 130 at its opposite limits of movement in a lateral direction with respect to the housing means.

It will be appreciated that a dental instrument in accordance with this form of the invention as well as the forms hereinafter described may be used for applying filling material to a tooth cavity, and then, in the same hand motion, the material may be thoroughly condensed or compacted into all parts and recesses of even the most complex cavities without the necessity of having to use another instrument and without withdrawing the instrument from the cavity for reloading.

Referring now to FIGS. 14–17 inclusive, a modified form of the invention is illustrated. This embodiment of the invention is similar in many respects to that described in connection with FIGS. 1–13 inclusive, and similar parts have been given the same reference numerals primed. The only difference in this form of the invention as compared with that previously described is that a tubular member 180 is substituted for flexible tubular member 130 in the previously described form of the invention. Member 180 does not have to be of flexible construction and is not adapted to oscillate in a lateral direction in the same manner as member 130.

Figure 17:
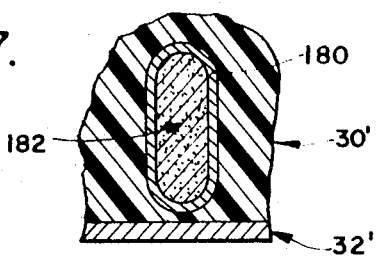
FIG. 17 is an enlarged sectional view taken substantially along line 17—17 of FIG. 14, looking in the direction of the arrows.

As seen most clearly in FIG. 17, tubular member 180 is of elongated cross-sectional configuration in the direction of reciprocation of plunger 54' whereby a body of amalgam 182 within the tubular member has a corresponding cross-sectional configuration.

The dimension of the body of amalgam is accordingly substantially greater in the direction of oscillation of the plunger 54' than the cross-sectional dimension of the plunger. On the other hand, the body of amalgam has a dimension extending substantially perpendicular to the direction of elongation thereof which is substantially the same as the cross-sectional dimension of the plunger. This can be seen most clearly in FIG. 15 wherein it will be noted that the body of amalgam has a dimension in one direction substantially the same as that of the bore 44' provided through the working tip 40'.

Referrng now to FIGS. 8–23 inclusive, still another form of the invention is illustrated including a housing means 190, the housing means supporting a removable head 191. A working tip 192 is supported by head 191 and has a bore 193 formed therethrough. The working tip includes an integral hollow cylindrical portion 194 slidably mounted within a bore 195 formed in head 191. A slot 196 is formed in the outer surface of the working tip and receives an undersize locking pin 197 as in the previous forms of the invention. A cylindrical bore 198 within portion 194 of the working tip slidably receives a reciprocating plunger 199 secured to piston 200. The piston and the associated plunger are adapted to be reciprocated in the same manner as discussed in connection with the previously described forms of the invention, and the components of the fluid pressure operating means have been given the same reference numerals primed.

Whereas the amalgam storage means in the previously described forms of the invention take the form of tubular members, the storage means in the embodiment shown in FIGS. 18–23 includes a cavity 210 in communication with a feed opening 212 in the side of the detachable head of the housing means. A pair of guide flanges 214 slidably receive a closure means 216 having a manually engageable portion 218 extending therefrom. It is apparent that sliding movement of closure means 216 is adapted to open and close opening 212 to provide access to the amalgam storage means of the apparatus.

An elongated leaf type spring 220 is secured to the inner surface of closure 216, this spring normally biasing a body of amalgam 222 disposed within the storage means laterally inwardly toward the center of the instrument.

The feed means in this form of the invention includes a feed member 230, the forward end 232 which is of substantially trapezoidal cross-sectional configuration as seen most clearly in FIG. 21. As seen in FIG. 20, the rear end of feed member 230 is connected to a rod 234 having an enlarged head 236 formed at the rear end thereof. A compression spring 238 is disposed within cavity 240 formed in the housing and engages head 236 for normally biasing the feed member forwardly to urge the body of amalgam disposed within the storage means toward the working tip and plunger.

Feed member 230 has a cavity 250 formed in the upper surface thereof which is adapted to receive the lower end of a lever 252 pivotally supported at 254 by the housing means. The upper end of lever 252 is received within a cavity 256 formed in the undersurface of a manually operated control slide member 260 having a knurled portion 262 adapted to receive the dentist's finger for manual manipulation during operation of the instrument.

As seen in FIG. 19, slide member 260 is in its rearwardmost position wherein feed member 230 is in its forwardmost position. On the other hand, in FIG. 20, the slide member 260 is shown in its forwardmost position while the feed member 230 is shown in its rearwardmost position.

A separate feed plunger 270 is provided, and as seen particularly in FIGS. 21 and 22, this feed plunger comprises a relatively narrow-blade-like plunger which never enters into the path of feed member 230. Feed plunger 270, when forced downwardly into the storage chamber 210, forces particles of amalgam into the path of feed member 230.

Plunger 270 is secured to a rod 272 having a compression spring 274 disposed in surrounding relationship thereto. Spring 274 is received within a cavity 276 formed in the removable head of the housing means and engages the undersurface of a collar 278 formed on rod 272 to thereby normally bias plunger 270 in an upward direction.

The upper end 280 of rod 272 is adapted to be engaged by a sloping undersurface 282 formed on the forward end of slide member 260. Accordingly, as slide member 260 moves into its forwardmost position as shown in FIG. 20, plunger 274 is moved downwardly.

The form of the invention shown in FIGS. 18-23 is particularly adapted for use in dispensing conventionally mixed amalgam. The amalgam is inserted through opening 212 in the side of the detachable head of the housing means and spring 220 forces the amalgam toward the center of the instrument. When slide member 260 is moved forwardly, feed member 230 is retracted and feed plunger 270 is moved downwardly to force particles of amalgam into the path of the feed member. When the slide member is then moved rearwardly, the feed plunger 270 is retracted under the influence of spring 274, and feed member 230 is moved forwardly to feed the amalgam into the path of reciprocating plunger 198.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

What is claimed is:

1. A hand-held dental instrument comprising a housing, a working tip supported by said housing, said working tip having a bore formed therethrough, a plunger mounted for reciprocatory movement within the bore of said working tip, fluid operated valving means in said housing in operative association with bore means extending to opposite sides of said plunger for automatically alternately controlling flow of fluid to opposite sides of said plunger for rapidly reciprocating said plunger during operation of the instrument with such rapidity as to cause vibration of said plunger and working tip and to simultaneously feed amalgam through said bore to a tooth to be filled, feed means supported by said housing and including storage means for receiving a reserve supply of amalgam, said storage means being in direct communication with the bore formed through said working tip, said feed means including transfer means for feeding amalgam during operation of the instrument directly from said storage means into the bore formed through said working tip and into the path of movement of said plunger.

2. Apparatus as defined in claim 1, wherein said housing includes a removable head, said working tip being supported by said removable head for limited reciprocation with respect thereto.

3. Apparatus as defined in claim 1, wherein said separate transfer means includes a fluid operated feed piston.

4. Apparatus as defined in claim 1, wherein said fluid operated means includes a piston operatively connected with said plunger, said piston being mounted for reciprocation within said housing, said valving means and said bore means operative to apply fluid pressure to opposite sides of said piston to cause reciprocation thereof during operation of the instrument.

5. Apparatus as defined in claim 4 wherein said valve means comprises a rotatable valving member adapted to control the flow of fluid through said bore means.

6. Apparatus as defined in claim 5 wherein said valve means includes a disc-like body means having a hole formed therethrough and including a cut-out portion, said disc-like body means being mounted for rotation within said housing.

7. Apparatus as defined in claim 1 including manually operated control means supported by said housing for controlling the feed of amalgam from said storage means into the bore formed through said working tip.

8. Apparatus as defined in claim 7 wherein said storage means includes a flexible tubular member supported for movement laterally with respect to said housing.

9. Apparatus as defined in claim 8 wherein said tubular member has a cross-sectional dimension greater than that of said plunger.

10. Apparatus as defined in claim 8 wherein said manual control means includes crank means operatively interconnected with said flexible tubular member for moving said flexible tubular member laterally with respect to said housing.

11. Apparatus as defined in claim 10 including a manually operable member operatively connected with said crank means and normally resiliently biased in one direction, said elongated member extending outwardly of said housing for manual operation.

12. Apparatus as defined in claim 1 wherein said storage means includes a tubular feed member of greater cross-sectional dimension than the cross-sectional dimension of said plunger.

13. Apparatus as defined in claim 12 wherein said tubular feed member is elongated in the direction of reciprocatory movement of said plunger and is of substantially the same cross-sectional dimension as said plunger in a direction extending at right angles to the direction of elongation of said tubular feed member.

14. Apparatus as defined in claim 1 wherein said feed means includes a feed member normally biased in a direction to feed amalgam from said storage means to the bore formed through said working tip, and manually operable means for moving said feed member in opposite directions.

15. Apparatus as defined in claim 14 including a feed opening formed in the side of said housing and in communication with said storage means for receiving amalgam, and closure means for closing off said feed opening.

16. Apparatus as defined in claim 14 including a separate feed plunger mounted for movement with respect to said housing and being engageable with amalgam in said storage means, said separate feed plunger being movable into said storage means.

17. Apparatus as defined in claim 16 wherein said separate feed plunger is resiliently biased away from said storage means.

18. Apparatus as defined in claim 17 including means cooperating with said manually operable means to move said separate feed plunger towards said storage means.

19. Apparatus as defined in claim 1 including a sleeve disposed in surrounding relationship to said working tip for facilitating the filling of large cavities.

20. Apparatus as defined in claim 19 wherein said sleeve is of generally tubular construction and is split longitudinally thereof to proved resiliency thereto.

References Cited

UNITED STATES PATENTS

| 2,598,624 | 5/1952 | Van Der Woulde | 32—60 |
| 3,164,903 | 1/1965 | Ellis | 32—56 X |
| 3,280,459 | 10/1966 | Walker et al. | 32—60 |

FOREIGN PATENTS 934,235  8/1963  Great Britain.

ROBERT PESHOCK, Primary Examiner